(12) United States Patent
Yu (10) Patent No.: US 7,517,135 B2
(45) Date of Patent: Apr. 14, 2009

(54) BACKLIGHT MODULE WITH FRAME HAVING ELASTIC MEMBER AND LIQUID CRYSTAL DISPLAY INCORPORATING SAME

(75) Inventor: Chih-Chia Yu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 65 days.

(21) Appl. No.: 11/601,886

(22) Filed: Nov. 20, 2006

(65) Prior Publication Data

US 2007/0115691 A1    May 24, 2007

(30) Foreign Application Priority Data

Nov. 18, 2005   (TW) .............................. 94140627 A (51) Int. Cl.
*G02F 1/1333*   (2006.01)
*F21V 7/04*    (2006.01)

(52) U.S. Cl. ........................ 362/633; 362/612; 362/613; 362/632; 362/634; 349/58; 349/60; 349/61; 349/65; 361/680; 361/681

(58) Field of Classification Search ................. 362/600, 362/610, 612, 613, 630, 631, 632, 633, 634; 349/58, 61, 65, 60; 361/680, 681
See application file for complete search history.

(56) References Cited

U.S. PATENT DOCUMENTS

| 6,046,785 A * | 4/2000 | Won .............................. 349/58 |
| 6,507,377 B1 * | 1/2003 | Jung ............................ 349/60 |
| 6,609,808 B2 | 8/2003 | Chen |
| 6,992,736 B2 * | 1/2006 | Saito et al. ..................... 349/58 |
| 7,128,461 B2 * | 10/2006 | Hwang ........................ 362/632 |
| 7,327,414 B2 * | 2/2008 | Won et al. ..................... 349/58 |
| 2002/0093810 A1 * | 7/2002 | Toyoda et al. ................. 362/31 |
| 2005/0141244 A1 * | 6/2005 | Hamada et al. ............. 362/612 |
| 2006/0044839 A1 * | 3/2006 | Choi et al. .................. 362/634 |

* cited by examiner

*Primary Examiner*—Jacob Y Choi
(74) *Attorney, Agent, or Firm*—Wei Te Chung (57) ABSTRACT

An exemplary backlight module includes a light guide plate (14), a frame (15), and an illuminator (16). The light guide plate includes a light incident surface (142), and a side surface (149) opposite to the light incident surface. The illuminator is adjacent the light incident surface. The frame receives the light guide plate and the illuminator, and includes an elastic member (156) either elastically pushing the side surface toward the illuminator or elastically pushing the illuminator toward the light incident surface.

17 Claims, 7 Drawing Sheets

BACKLIGHT MODULE WITH FRAME HAVING ELASTIC MEMBER AND LIQUID CRYSTAL DISPLAY INCORPORATING SAME

FIELD OF THE INVENTION

The present invention relates to backlight modules such as those used in liquid crystal displays (LCDs), and more particularly to a backlight module that has a frame with an elastic member, and a liquid crystal display including the backlight module.

GENERAL BACKGROUND

Liquid crystal displays are commonly used as displays for compact electronic apparatuses, because they not only provide good quality images with little power but are also very thin. The liquid crystal in a liquid crystal display does not emit any light itself. The liquid crystal has to be lit by a light source so as to clearly and sharply display text and images. Thus, a backlight module is generally needed for a liquid crystal display.

Figure 8:
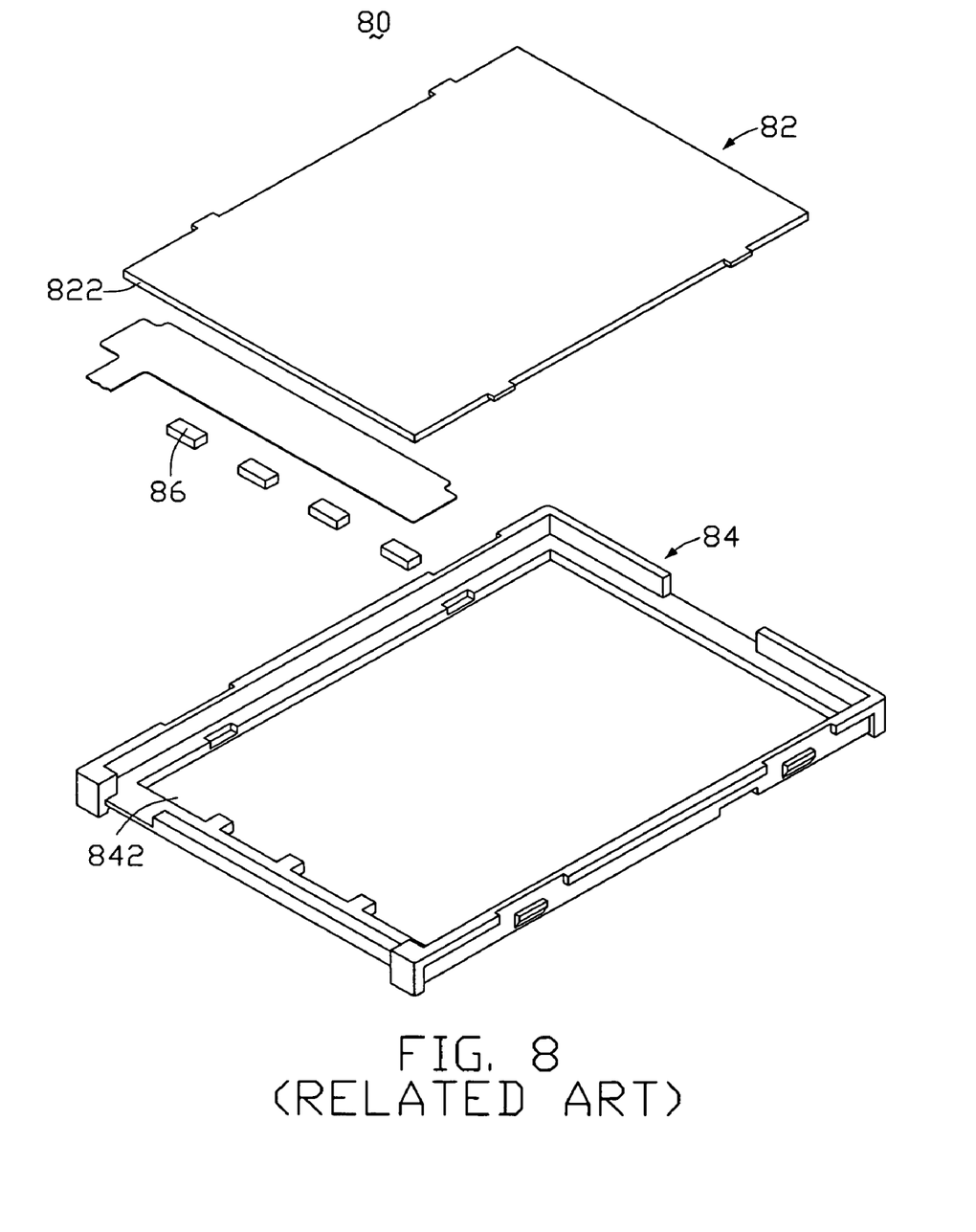
FIG. 8 is an exploded, isometric view of certain parts of a conventional backlight module, the backlight module including a light guide plate and a plurality of light emitting diodes, the light guide plate having a light incident surface.

Referring to FIG. 8, a typical backlight module 80 includes a light guide plate 82, a plastic frame 84, and a plurality of light emitting diodes (LEDs) 86. The light emitting diodes 86 are disposed adjacent to a light incident surface 822 of the light guide plate 80, and collectively serve as a light source. The plastic frame 84 defines a plurality of adjacent cutouts 842 at an inside of one main beam thereof. The light guide plate 82 is received in the plastic frame 84, and the light emitting diodes 86 are respectively received in the cutouts 842.

However, the sizes of the cutouts 842 may not accurately match the sizes of the light emitting diodes 86 due to imprecise manufacturing. When this happens, small gaps exist between the light emitting diodes 86 and the light incident surface 822 of the light guide plate 82 after the backlight module 80 has been assembled. These gaps may diminish the emitting luminance of the light guide plate 82.

Figure 9:
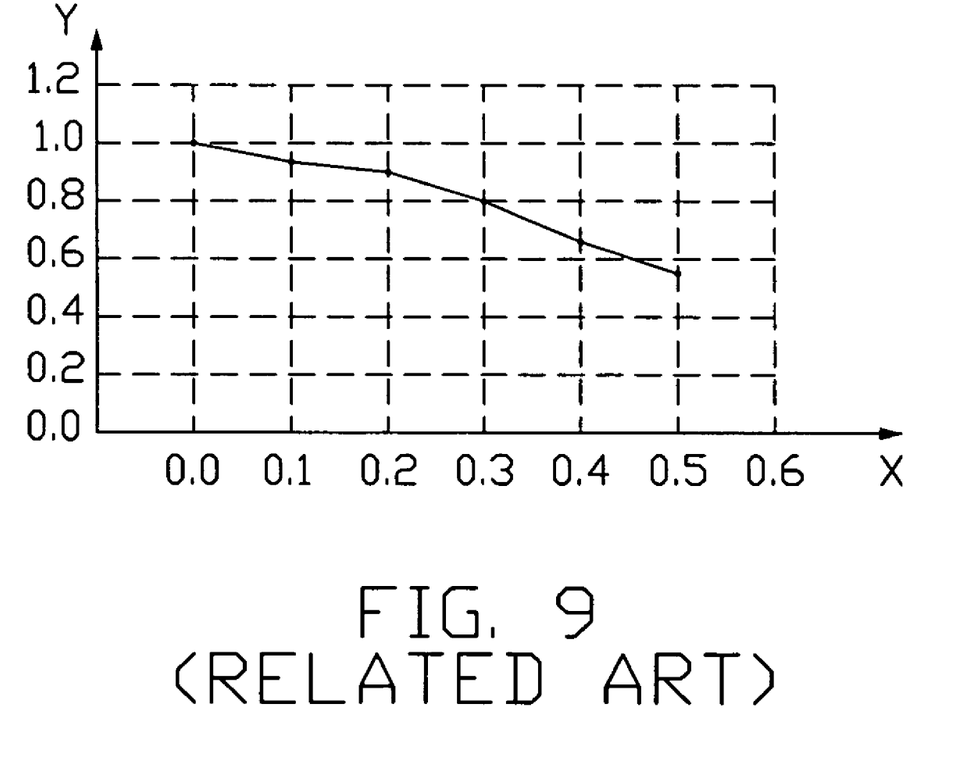
FIG. 9 is a graph in relation to the backlight module of FIG. 8 once assembled, showing relative emitting luminance ("Y") of the light guide plate varying as a function of a distance ("X") between the light emitting diodes and the light incident surface of the light guide plate.

FIG. 9 is a graph showing the negative impact of the above-mentioned gaps on the effective utilization of the emitting luminance. X represents the distance between the light emitting diodes 86 and the light incident surface 822 of the light guide plate 82 in millimeters (mm). Y represents the relative emitting luminance of the light guide plate 82 as a function of X. It can be seen that the greater the value of X, the lower the value of Y. That is, the greater the gaps, the lower the value of the relative emitting luminance.

What is needed, therefore, is a backlight module that can overcome the above-described deficiencies. What is also needed is a liquid crystal display employing such a backlight module.

SUMMARY

In a preferred embodiment, a backlight module includes a light guide plate, an illuminator, and a frame. The light guide plate includes a light incident surface, and a side surface opposite to the light incident surface. The illuminator is adjacent the light incident surface. The frame receives the light guide plate and the illuminator, and includes an elastic member either elastically pushing the side surface toward the illuminator or elastically pushing the illuminator toward the light incident surface.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
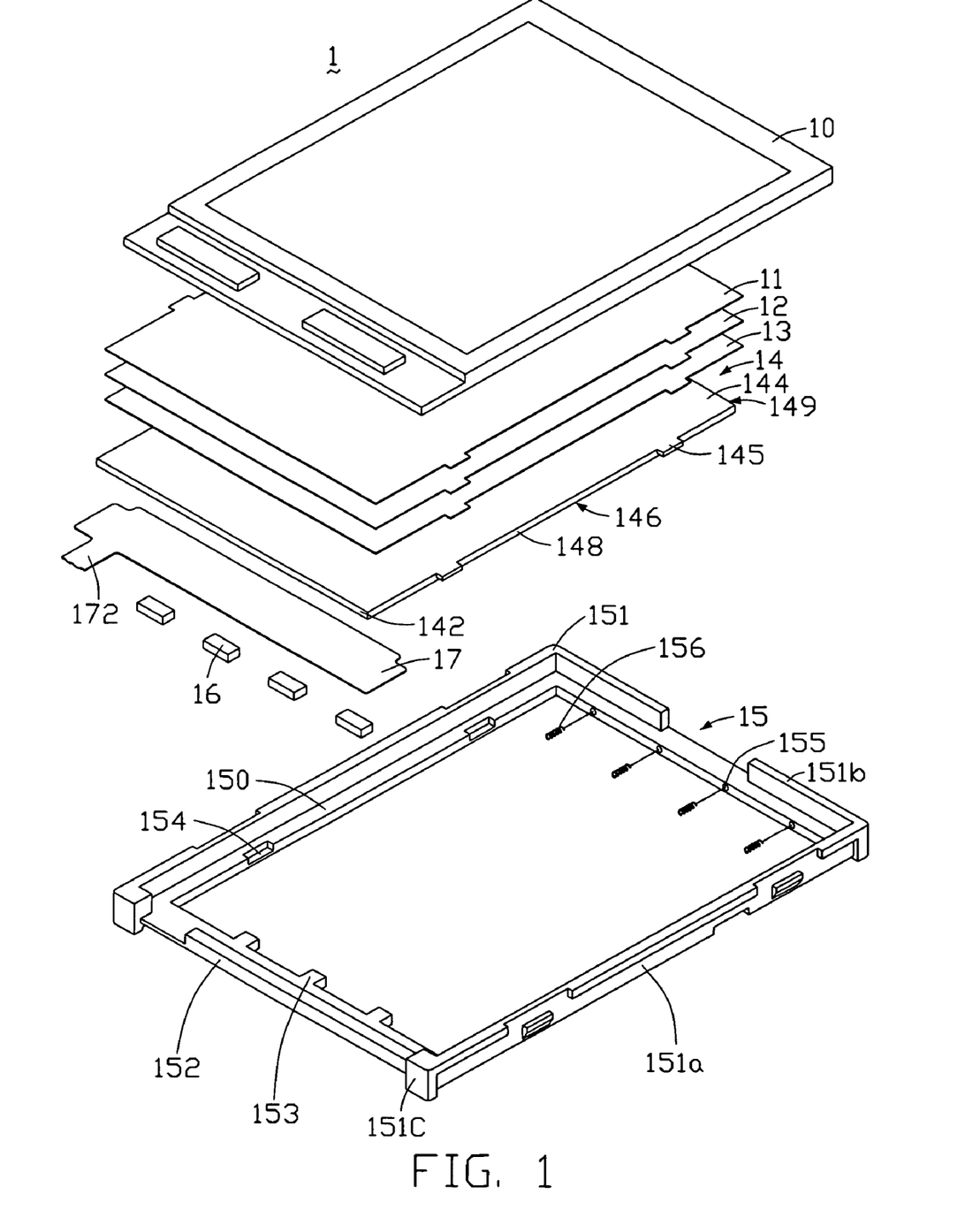
FIG. 1 is an exploded, isometric view of a liquid crystal display according to a first embodiment of the present invention, the liquid crystal display including a light guide plate, a frame, a plurality of point illuminators, and a printed circuit board.

Referring to FIG. 1, a liquid crystal display according to a first embodiment of the present invention is shown. The liquid crystal display 1 includes a liquid crystal panel 10, a first brightness enhancement film (BEF) 11, a second BEF 12, a diffusing film 13, and a light guide plate 14, arranged in that order from top to bottom. The liquid crystal display 1 further includes a frame 15, a plurality of point illuminators 16 for being located adjacent to a light incident surface 142 of the light guide plate 14, and a printed circuit board 17 electrically connected with the point illuminators 16. The first BEF 11, the second BEF 12, the diffusing film 13, the light guide plate 14, the frame 15, and the point illuminators 16 cooperatively form a backlight module (not labeled).

The printed circuit board 17 includes a connection strip 172 extending from a main body (not labeled) thereof. The point illuminators 16 are attached on the main body of the printed circuit board 17, and cooperatively serve as a light source. In the illustrated embodiment, the point illuminators 16 are four light emitting diodes, and the printed circuit board 17 is a flexible printed circuit board (FPCB).

The light guide plate 14 further includes a light emitting surface 144 perpendicularly connecting with the light incident surface 142, a bottom surface 146 opposite to the light emitting surface 144, two opposite first side surfaces 148 connecting with the light incident surface 142, and a second side surface 149 opposite to the light incident surface 142. The light incident surface 142, the first side surfaces 148, and the second side surface 149 are all between the light emitting surface 144 and the bottom surface 146. The diffusing film 13 is disposed adjacent to the light emitting surface 144 of the light guide plate 14. A pair of ears 145 outwardly extend from each first side surface 148. The ears 145 are near end portions (not labeled) of the respective first side surfaces 148. The light guide plate 14 can for example be made from polycarbonate (PC) or polymethyl methacrylate (PMMA), and can be manufactured by an injection molding method.

The frame 15 is generally rectangular. The frame 15 includes a supporting board 150, two symmetrically opposite first side walls 151, and a second side wall 152. The supporting board 150 is in general a rectangular frame forming part of the frame 15. Portions of the supporting board 150 perpendicularly extend inward from inner surfaces (not labeled) of the first side walls 151 and the second side wall 152. Thus the supporting board 150 defines a rectangular space (not labeled) for accommodating the first BEF 11, the second BEF 12, the diffusing film 13, and the light guide plate 14. A plurality of protrusions 153 are formed along an inner surface (not labeled) of the supporting board 150 at one short side of the frame 15 where the second side wall 152 is located. In the illustrated embodiment, there are three protrusions 153. The protrusions 153 are parallel to each other, and extend into the space. The point illuminators 16 can be respectively disposed in a series of rooms defined between every two adjacent protrusions 153 and between endmost protrusions 153 and corresponding portions of the supporting board 150. The supporting board 150 defines two pairs of notches 154 and four holes 155. The pairs of notches 154 are positioned at two opposite long inner sides (not labeled) of the supporting board 150 respectively. Each notch 154 corresponds to a respective one of the ears 145 of the light guide plate 14. That is, the ears 145 can be received in the notches 154 respectively. The holes 155 are positioned at one short inner side (not labeled) of the supporting board 150 at another short side of the frame 15 opposite from the protrusions 153. Four springs 156 are fittingly engaged in the holes 155 respectively, with a depth of each hole 155 being less than a length of each spring 156 in a normal state. The frame 15 is preferably made from white polycarbonate or plastic. Alternatively, the frame 15 can be made from any other suitable material.

Each first side wall 151 has a generally asymmetrical U-shape, and includes a first arm 151a, a second arm 151b, and a third arm 151c. The first arm 151a extends along a corresponding first long side of the frame 15. The second arm 151b and the third arm 151c extend along the two opposite short sides of the frame 15 respectively. The second arm 151b is longer than the third arm 151c. The second arms 151b of the opposite first side walls 151 are aligned with each other. The second side wall 152 is bar-shaped. The second side wall 152 perpendicularly extends from the spacing board 150, and connects with only one of the third arms 151c. That is, an opening (not labeled) is defined between the second side wall 152 and the other third arm 151c. The connection strip 172 of printed circuit board 17 can be received in the opening.

Figure 2:
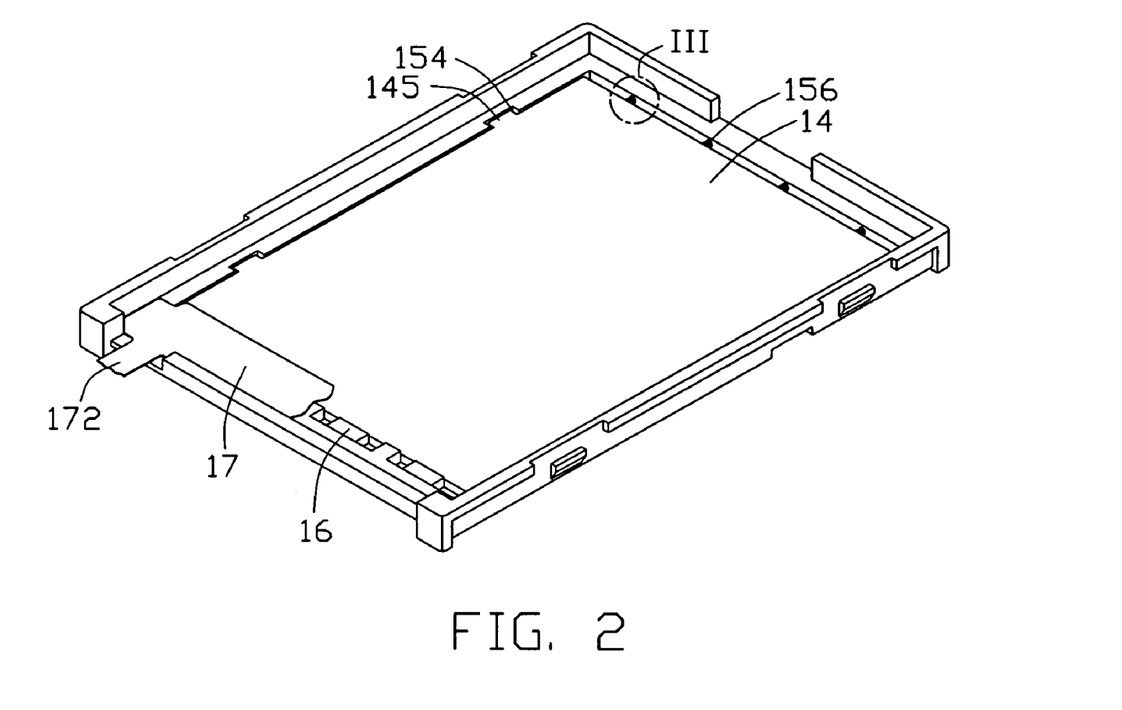
FIG. 2 is an assembled view of the light guide plate, the frame, the point illuminators, and the printed circuit board of FIG. 1, with the printed circuit board partially cut away to show two of the point illuminators.
Figure 3:
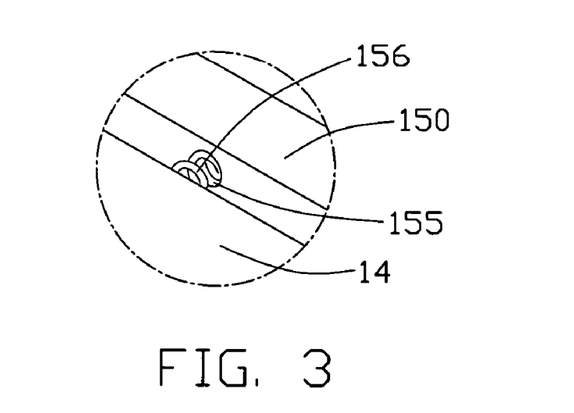
FIG. 3 is an enlarged view of a circled portion III of FIG. 2.

When the liquid crystal display 1 is assembled, the liquid crystal panel 10, the first BEF 11, the second BEF 12, the diffusing film 13, the light guide plate 14, and the point illuminators 16 are received in the frame 15. Edge portions of the liquid crystal panel 10 are supported by the supporting board 150. The connection strip 172 of the printed circuit board 17 extends out from the frame 15 through the opening. Referring also to FIG. 2 and FIG. 3, the ears 145 of the light guide plate 14 are received in the notches 154 of the frame 15 respectively. The springs 156 extend from the holes 155 and elastically press the second side surface 149 of the light guide plate 14, thereby pushing the light guide plate 14 toward or even against the point illuminators 16.

That is, the springs 156 push the second side surface 149 of the light guide plate 14 toward the point illuminators 16, so that the light incident surface 142 of the light guide plate 14 is held very close to or against the point illuminators 16. Thereby, gaps between the point illuminators 16 and the light incident surface 142 are decreased or even eliminated. This enables the liquid crystal display 1 to provide improved brightness and uniformity of emitting luminance.

Figure 4:
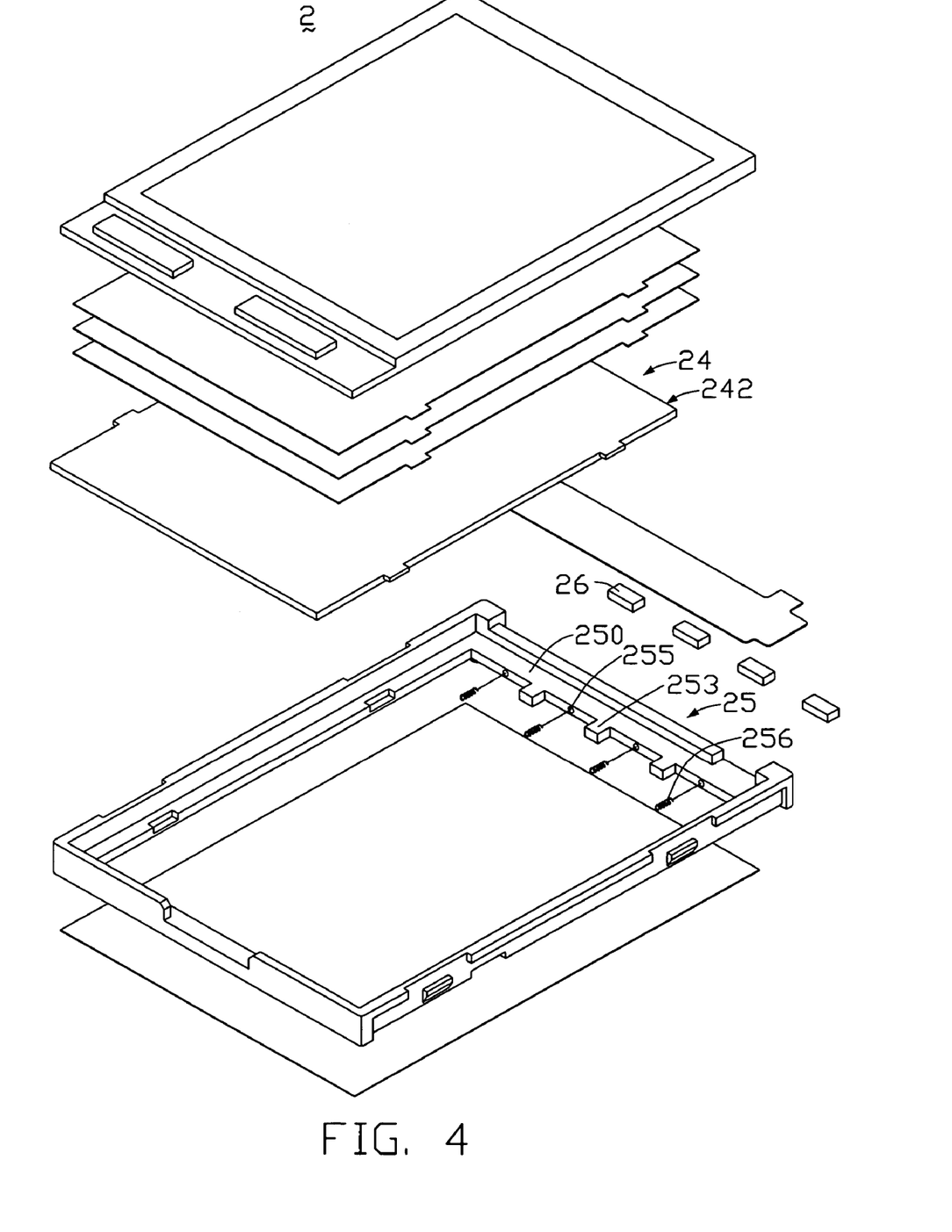
FIG. 4 is an exploded, isometric view of a liquid crystal display according to a second embodiment of the present invention, the liquid crystal display including a light guide plate, a frame, a plurality of point illuminators, and a printed circuit board.

Referring to FIG. 4, a liquid crystal display 2 according to a second embodiment of the present invention is shown. The liquid crystal display 2 is similar to the liquid crystal display 1. However, the liquid crystal display 2 includes a light guide plate 24, a frame 25, and four point illuminators 26. The frame 25 includes three protrusions 253 extending from an inner surface (not labeled) of a supporting board 250 thereof. The protrusions 253 are parallel to each other, and the point illuminators 26 are respectively disposed in a series of rooms defined between every two adjacent protrusions 253 and between endmost protrusions 253 and corresponding portions of the supporting board 250. The supporting board 250 defines four holes 255 therein, the holes 255 communicating with the rooms 253 respectively. Four springs 256 are fittingly engaged in the holes 255 respectively, with a depth of each hole 255 being less than a length of each spring 256 in a normal state.

Figure 5:
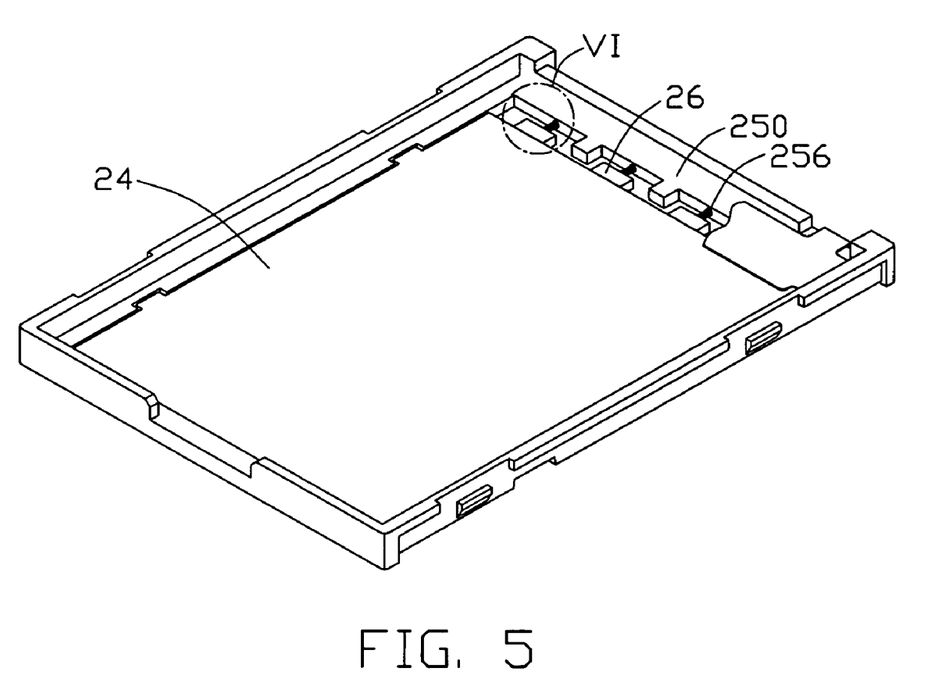
FIG. 5 is an assembled view of the light guide plate, the frame, the point illuminators, and the printed circuit board of FIG. 4, with the printed circuit board partially cut away to show three of the point illuminators.
Figure 6:
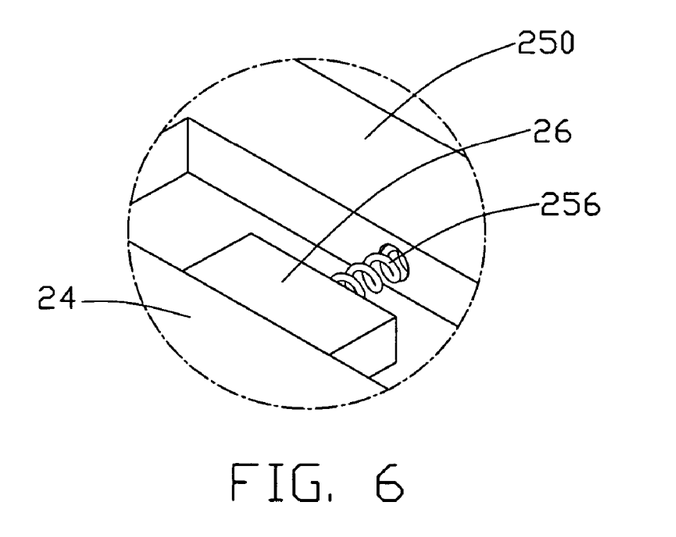
FIG. 6 is an enlarged view of a circled portion VI of FIG. 5.

When the liquid crystal display 2 is assembled, the light guide plate 24 is received in the frame 25. Referring also to FIG. 5 and FIG. 6, the point illuminators 26 are pushed by the springs 256 toward a light incident surface 242 of the light guide plate 24. As a result, the point illuminators 26 are held very close to or against the light incident surface 242 of the light guide plate 24. Thereby, gaps between the point illuminators 26 and the light incident surface 242 are decreased or even eliminated. The liquid crystal display 2 can achieve advantages similar to those of the liquid crystal display 1.

Figure 7:
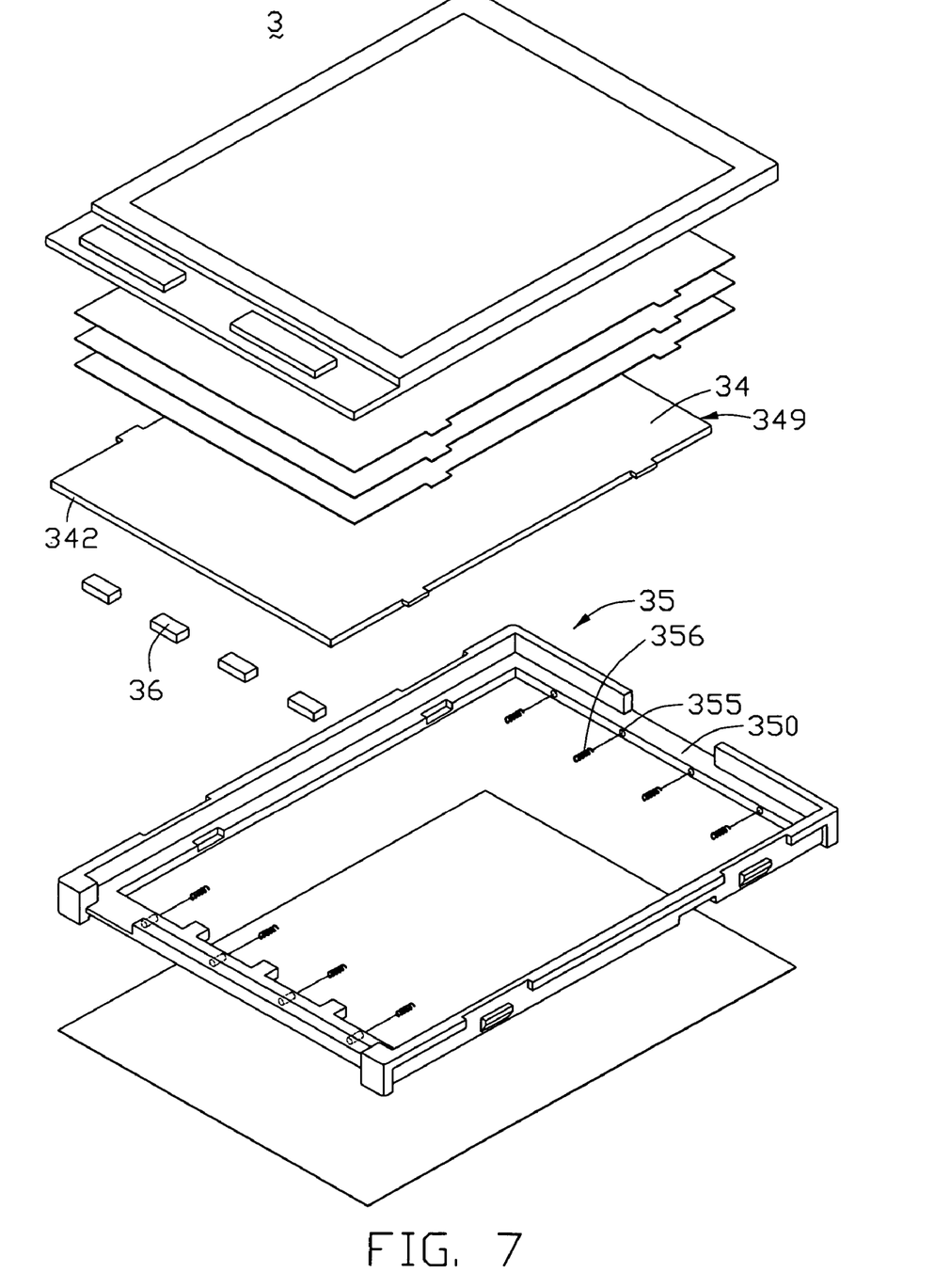
FIG. 7 is an exploded, isometric view of a liquid crystal display according to a third embodiment of the present invention.

Referring to FIG. 7, a liquid crystal display 3 according to a third embodiment of the present invention is shown. The liquid crystal display 3 is similar to the liquid crystal displays 1, 2. However, the liquid crystal display 3 includes a light guide plate 34, a frame 35, and four point illuminators 36. The frame 35 defines two sets of holes 355, each set having four holes 355. The sets of holes 355 are located in each of two opposite inner short sides (not labeled) of a supporting board 350 of the frame 35. The light guide plate 34 includes a light incident surface 342 and an opposite side surface 349. When the liquid crystal display 3 is assembled, four springs 356 push the point illuminators 36 toward the light incident surface 342 of the light guide plate 34, and another four springs 356 push the side surface 349 of the light guide plate 34 toward the point illuminators 36. Thereby, gaps between the point illuminators 36 and the light incident surface 342 are decreased or even eliminated. The liquid crystal display 3 can achieve advantages similar to those of the liquid crystal displays 1, 2.

Further or alternative embodiments may include the followings. In one example, the springs 156, 256, 356 can be other components with desired elasticity, such as elastic rubber cylinders. In another example, the number of the springs

156, 256, 356 can be varied. For example, one, two, three, five or more springs 156, 256, 356 can be employed as required.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
 a light guide plate comprising:
  a light incident surface; and
  a side surface opposite to the light incident surface;
 an illuminator adjacent the light incident surface;
 a frame receiving the light guide plate and the illuminator, the frame comprising:
  a first side wall adjacent to the light incident surface; and
  a second side wall adjacent to the side surface, each of the first side wall and the second side wall defining a receiving hole;
 a first elastic member received in the receiving hole of the first side wall and elastically pushing the illuminator toward the light incident surface; and
 a second elastic member received in the receiving hole of the second side wall and elastically pushing the side surface toward the illuminator.

2. The backlight module in claim 1, wherein the first elastic member extends from the receiving hole toward the side surface of the light guide plate.

3. The backlight module in claim 1, wherein the illuminator is interposed between the first elastic member and the light incident surface.

4. The backlight module in claim 1, wherein the first elastic member is a helical spring.

5. The backlight module in claim 1, wherein the illuminator is a point illuminator.

6. The backlight module in claim 5, wherein the point illuminator is a light emitting diode.

7. The backlight module in claim 1, wherein the frame is made from polycarbonate or plastic.

8. The backlight module in claim 1, wherein the first elastic member is detachably received in the receiving hole.

9. A backlight module comprising:
 a light guide plate comprising a light incident surface;
 an illuminator adjacent the light incident surface; and
 a frame receiving the light guide plate and the illuminator, the frame comprising:
  a first side wall adjacent to the light incident surface; and
  a second side wall opposite to the first side wall, each of the first side wall and the second side wall defining a receiving hole;
 a first elastic member received in the receiving hole of the first side wall and elastically pushing the illuminator toward the light guide plate such that a gap between the illuminator and the light incident surface is kept to a minimum or there is no gap between the illuminator and the light incident surface; and
 a second elastic member received in the receiving hole of the second side wall and elastically pushing the light guide plate toward the illuminator.

10. The backlight module in claim 9, wherein the light guide plate further comprises a side surface opposite to the light incident surface, and the second elastic member extends from the receiving hole and pushes the side surface of the light guide plate.

11. The backlight module in claim 9, wherein the illuminator is interposed between the first elastic member and the light incident surface.

12. The backlight module in claim 9, wherein the first elastic member is a helical spring.

13. The backlight module in claim 9, wherein the first elastic member is detachably received in the receiving hole.

14. A liquid crystal display comprising:
 a liquid crystal panel; and
 a backlight module adjacent the liquid crystal panel, the backlight module comprising:
  a light guide plate comprising:
   a light incident surface; and
   a side surface opposite to the light incident surface;
  an illuminator adjacent the light incident surface; and
  a frame receiving the light guide plate and the illuminator, the frame comprising:
   a first side wall adjacent to the light incident surface; and
   a second side wall adjacent to the side surface, each of the first side wall and the second side wall defining a receiving hole;
  a first elastic member received in the receiving hole of the first side wall and elastically pushing the illuminator toward the light incident surface; and
  a second elastic member received in the receiving hole of the second side wall and elastically pushing the light guide plate toward the illuminator.

15. The liquid crystal display in claim 14, wherein the second elastic member extends from the receiving hole and pushes the side surface of the light guide plate.

16. The liquid crystal display in claim 14, wherein the illuminator is interposed between the first elastic member and the light incident surface.

17. The liquid crystal display in claim 14, wherein the first elastic member is a helical spring.

* * * * *